(12) United States Patent  
Johnson et al.

(10) Patent No.: US 6,736,155 B1  
(45) Date of Patent: May 18, 2004

(54) AIR OILER FILLER

(75) Inventors: Keith Johnson, Ostrander, OH (US); Don Ingles, La Rue, OH (US)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 10/113,341

(22) Filed: Mar. 29, 2002

(51) Int. Cl.[7] .................................................. F04F 1/06
(52) U.S. Cl. .......................... 137/14; 137/209; 137/263; 137/883; 184/55.1
(58) Field of Search .................. 137/14, 209, 263, 137/883; 184/55.1

(56) References Cited

U.S. PATENT DOCUMENTS

| | | | |
|---|---|---|---|
| 464,021 A | * 12/1891 | Hartin | 137/209 |
| 2,435,832 A | * 2/1948 | Harvuot | 184/55.1 |
| 3,612,090 A | * 10/1971 | Kassel | 137/209 |
| 4,091,894 A | * 5/1978 | Lang | 184/105.1 |
| 4,359,140 A | 11/1982 | Shreve | 184/6.3 |
| 4,479,468 A | 10/1984 | Norwood, Sr. | 123/196 S |
| 4,622,988 A | * 11/1986 | Takimoto et al. | 137/209 |
| 5,018,491 A | 5/1991 | Fish | 123/196 S |
| 5,070,831 A | 12/1991 | Yunick | 123/196 A |
| 5,246,086 A | 9/1993 | Yunick | 184/1.5 |

* cited by examiner

Primary Examiner—Gerald A. Michalsky  
(74) Attorney, Agent, or Firm—Standley Law Group LLP

(57) ABSTRACT

An apparatus and a method for the filling of pressurized lubricant reservoirs such as is found on air oilers and the like. A storage tank of lubricant capable of being pressurized for the delivery of the lubricant to the individual lubricant reservoirs on one or several pieces of machinery or tools. The storage tank is connected with at least a line and a valve to a source of pressurized air that will be used to overcome a threshold pressure required to move the lubricant from the storage tank to the individual lubricant reservoirs. The storage tank may be connected to a piping manifold with valves to isolate lines leading to individual lubricant reservoirs. Check valves may be used as appropriate to prevent backflow of lubricant from an individual lubricant reservoir to the manifold, other commonly connected individual lubricant reservoirs, the storage tank, or the source of pressurized air, such as an air compressor.

29 Claims, 4 Drawing Sheets

AIR OILER FILLER

BACKGROUND AND SUMMARY OF THE INVENTION

The present invention involves an apparatus and a method for the filling of pressurized lubricant reservoirs such as is found on air oilers and the like.

A vast number of industrial operations require some type of lubrication in order to operate machinery or tools. It is common for lubricants to be conveyed within a particular machine using a pressurized system to facilitate distribution of an adequate quantity of lubricant within the machinery itself. For example, high speed manufacturing equipment may require an internal pressurized lubrication system where gravity fed systems are unable to adequately deliver lubricant throughout a particular system. Typical manufacturing equipment includes robot head assemblies having piston and cylinder mechanisms for actuation. It is common for such machines to have a reservoir of lubricant that is part of the pressurized lubrication system. Typically, the reservoir must be refilled on a periodic schedule of maintenance. This schedule may entail, for example, a daily or semi-daily refill of the lubricant reservoir for a particular machine. Many times, due to clearances required for machine part or product movements, or due to other maintenance considerations, the size of the lubricant reservoir cannot be enlarged to reduce the frequency of refilling such reservoirs. As a result, a regular refilling schedule must be followed.

Since the lubricant reservoir must, at some point, become pressurized as part of the internal lubrication system, it is sometimes necessary to shut down the machinery to refill the lubricant reservoir. During the refilling operation, a cap or plug must be removed from the lubricant reservoir. If the lubrication system were to remain pressurized during the cap removal, lubricant may come out of the reservoir and onto exterior equipment surfaces and the manufactured product. The periodic shutdowns required in meeting a regular lubrication refilling schedule result in an inherent inefficiency in the operation of such machinery.

The ramifications of time used during the performance of the process of shutting down and restarting industrial equipment can ripple through a workforce. Usually, there are specific and sometimes timely procedures to be followed during the shutdown and startup process. In addition, lockdown and tagout procedures have to be followed. Besides the time required of maintenance personnel, the time taken during a shutdown can idle manufacturing and assembly personnel for lack of operational equipment.

In addition, the assembly of various pieces of machinery in an industrial operation may place pressurized lubricant reservoirs in serviceable, yet awkward locations or positions. As a result, additional inefficiencies may arise in the performance of the regular lubrication schedule, as operations personnel must take additional time to accommodate the position of the filler for a lubricant reservoir. Such awkward placement of filler access can result in spillage onto the machinery and elsewhere, and perhaps of even more concern, the failure of operations personnel to perform the desired service to machinery and tools.

The present invention is an apparatus and a method to reduce the inefficiencies arising from the refilling of pressurized lubrication reservoirs. The present invention is an apparatus having a storage tank of lubricant capable of being pressurized for the delivery of the lubricant to the individual lubricant reservoirs of pieces of machinery or tools.

Preferably, the apparatus is comprised of a tank for the storage of lubricant prior to the delivery of the lubricant to the individual lubricant reservoirs on one or several pieces of machinery. The storage tank is connected with at least a line and a valve to a source of pressurized fluid, such as pressurized air, that will be used to overcome a threshold pressure required to move the lubricant from the storage tank to the individual lubricant reservoirs. It is possible for the source of pressurized fluid to be detachably connected from the storage tank via a quick release coupling wherein the source of pressurized fluid may be moved and used on additional storage tanks as described in the present application. The storage tank is also connected to a means for distributing the lubricant to individual lubricant reservoirs. For example, a piping manifold with valves to isolate lines leading to individual lubricant reservoirs will suitably distribute pressurized lubricant to the reservoirs. The present invention may additionally comprise check valves as appropriate to prevent backflow of lubricant from an individual lubricant reservoir to the manifold, other commonly connected individual lubricant reservoirs, the storage tank, or the source of pressurized fluid, such as an air compressor.

An object of the present invention is to reduce the inefficiencies arising from the refilling of pressurized lubrication reservoirs. As part of a typical maintenance schedule, the present invention is intended to reduce the amount of time required to refill individual lubricant reservoirs on industrial machinery and tools. The refilling of the lubricant reservoirs may be conducted during the operation of the associated equipment. For example, the refilling operation may be performed during the interval between operating cycles of a robot head assembly. The present invention can minimize the inconvenience of awkwardly placed filler access by the installation of piping to a manifold that relocates the maintenance operations to a readily accessible location on or near a piece of industrial equipment. In addition, the present invention can include a manifold connecting several individual reservoirs to a storage tank.

An object of the present invention is to reduce the frequency of engaging in the process of shutting down and restarting industrial equipment in order to perform the maintenance task of refilling the lubricant reservoir of a pressurized lubrication system. The present invention provides a pressurized refilling mechanism wherein it is not required that the machinery or tool works be halted in order to refill a lubricant reservoir. The present invention describes a process whereby lubricant is transferred from a storage tank by a pressure sufficient to overcome the threshold pressure generated within a given internal pressurized lubrication system. As a result, the present invention can reduce the amount of downtime on the machinery resulting from the refilling of the lubricant reservoirs.

In addition to the novel features and advantages mentioned above, other objects and advantages of the present invention will be readily apparent from the following descriptions of the drawings and preferred embodiments.

DETAILED DESCRIPTION OF THE EXEMPLARY EMBODIMENT(S)

Figure 1:
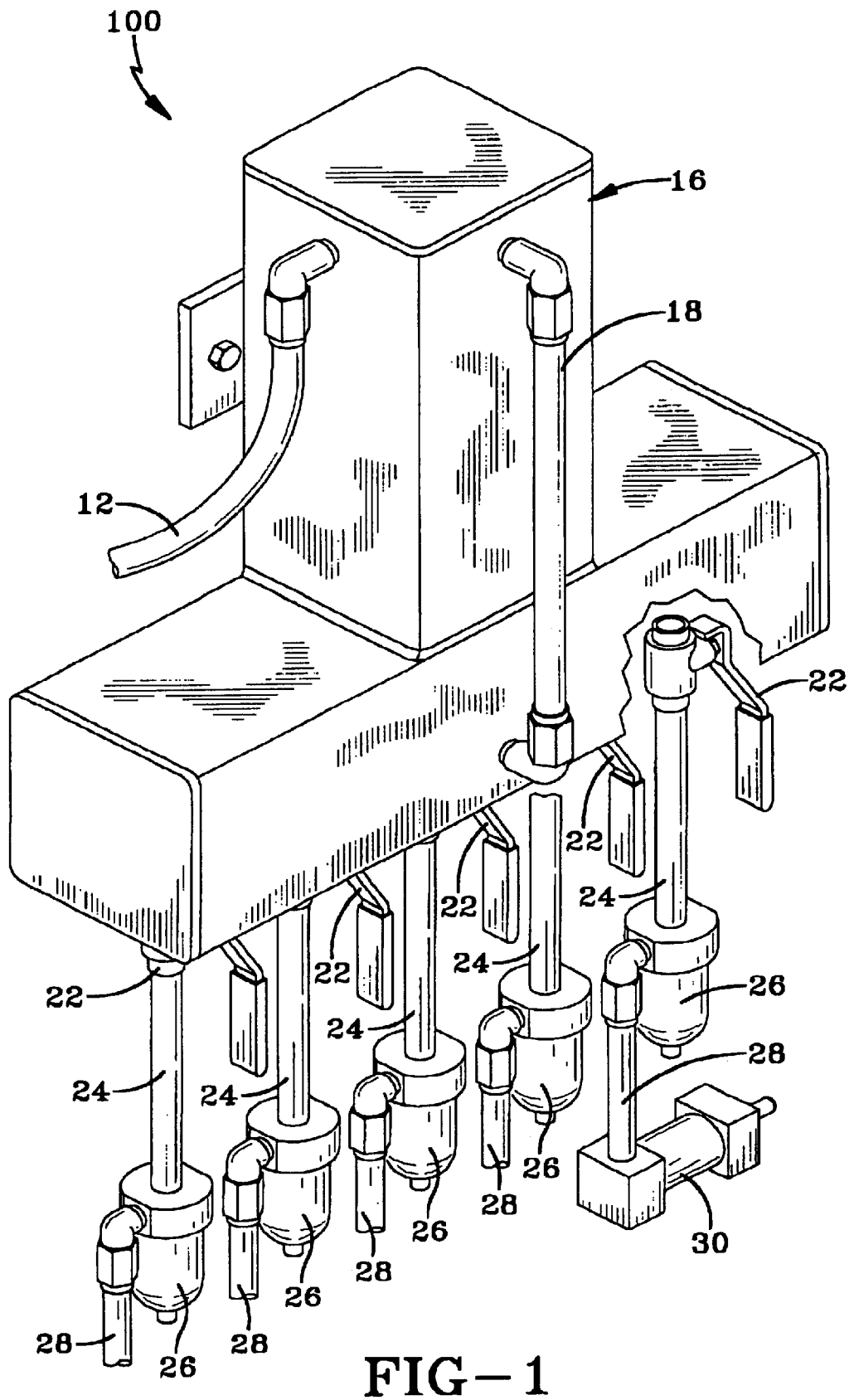
FIG. 1 is a perspective view of an embodiment of the apparatus of the present invention.

The present invention involves an apparatus and a method for the filling of pressurized lubricant reservoirs such as is found on air oilers and the like. FIG. 1 at 100 shows a perspective view and FIG. 2 at 100 shows a front elevation view of an embodiment of the apparatus of the present invention. As can be observed, a tank 16 is provided to hold a supply of lubricant such as oil. The tank 16 can be filled with lubricant using any conventional means for access to a container such as a screw cap, bung, hatch, or via connection to a lubricant supply line. The tank 16 shown here has a generally inverted T-shape, but other shapes are possible. In addition, the tank 16 may be made from any material typically used for making storage tanks having sufficient strength to withstand an internal pressurization. Examples of suitable materials for the construction of the tank 16 include steel and fiberglass. The tank 16 shown in FIGS. 1 and 2 also includes a sight glass 18 that is used to visually observe the level of lubricant held by the tank 16.

The tank 16 is connected to a source of pressurized fluid (see FIG. 4), such as air from a pressurized air source. The pressure applied to the tank 16 may also be restricted by the use of a pressure regulator (see FIG. 4) operating on the output of the source of pressurized air. For example, if a pressurized lubricant reservoir 26 operates at a pressure of 90 psig transmitted via pressure line 28 connected to a cylinder on a robot head assembly 30, then the tank must be pressurized above 90 psig in order for the flow of a lubricant to proceed from the tank 16 to the reservoir 26. In such a scenario, it is not required for the pressure of the tank 16 to exceed the example threshold pressure of 90 psig by a large amount. Instead, a pressure regulator may be used to limit the disparity between the tank and reservoir pressures for greater control of the flow of lubricant and in consideration of the operational pressure ratings of the tank 16, the reservoirs 26, the robot head assembly 30, and the associated valves, pipe and fittings.

Figure 2:
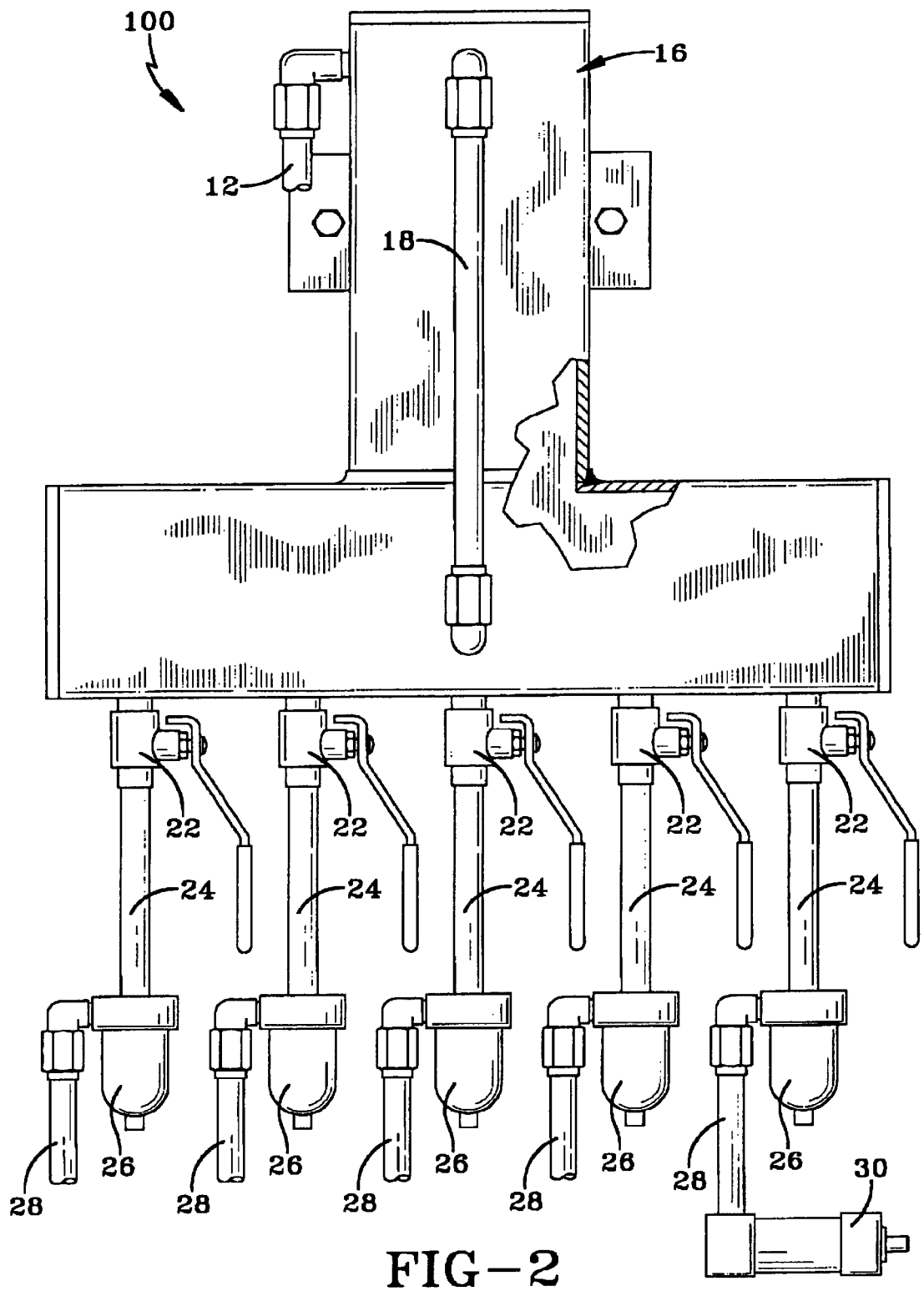
FIG. 2 is a front elevation view of an embodiment of the apparatus of the present invention.

As shown in FIGS. 1 and 2, the tank 16 is connected to a source of pressurized air through a first line 12. It is also possible to install a check valve between the tank 16 and a source of pressurized air that will close upon a pressure in the tank 16 being greater than a pressure of the source of pressurized air. Such a check valve will prevent a backflow of lubricant from tank 16 toward the source of pressurized air.

After the tank 16 holding a lubricant is pressurized to a sufficient pressure to allow the lubricant to fill at least one of the pressurized lubricant reservoirs 26, one or more of the distribution valves 22 may be opened to allow the flow of lubricant from the tank. 16. As shown, the tank 16 is connected to the reservoirs 26 without the use of a manifold. Although five distribution valves 22 are shown in FIGS. 1 and 2, the present invention is adaptable to accommodate additional distribution valves by making additional piping connections to the tank 16. The typical flow of lubricant will be from the tank 16, through an open distribution valve 22, through a distribution line 24 and into the pressurized lubricant reservoir 26.

Figure 4:
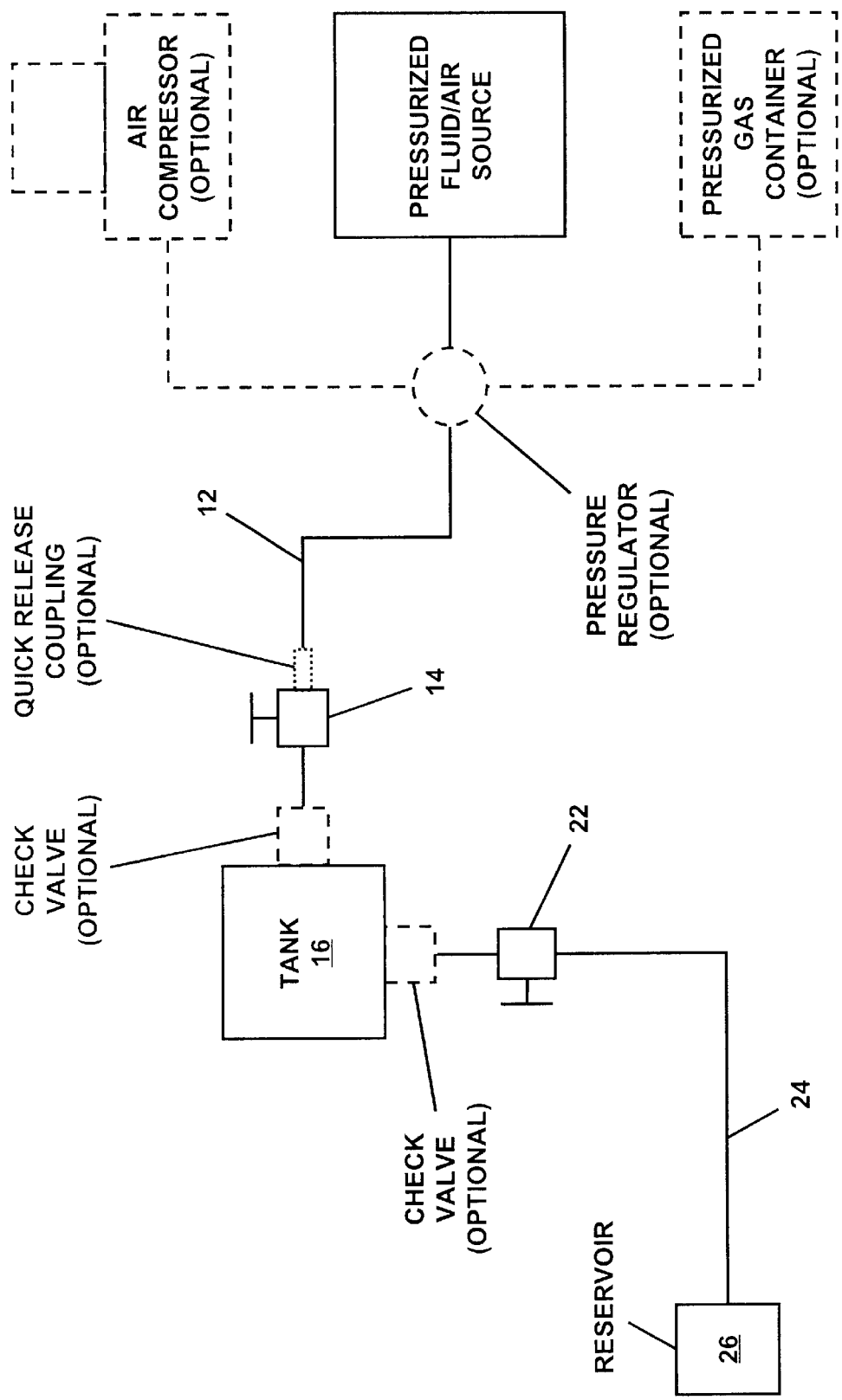
FIG. 4 is a diagrammatic representation of an exemplary embodiment of the present invention.

As shown in FIG. 4, an exemplary embodiment of the present invention may include check valves connected to the distribution lines 24 that will close upon a pressure in the pressurized lubricant reservoirs 26 being greater than a pressure in the tank 16. Check valves connected to the distribution lines 24 will prevent backflow to commonly connected lubricant reservoirs 26 and the tank 16.

Figure 3:
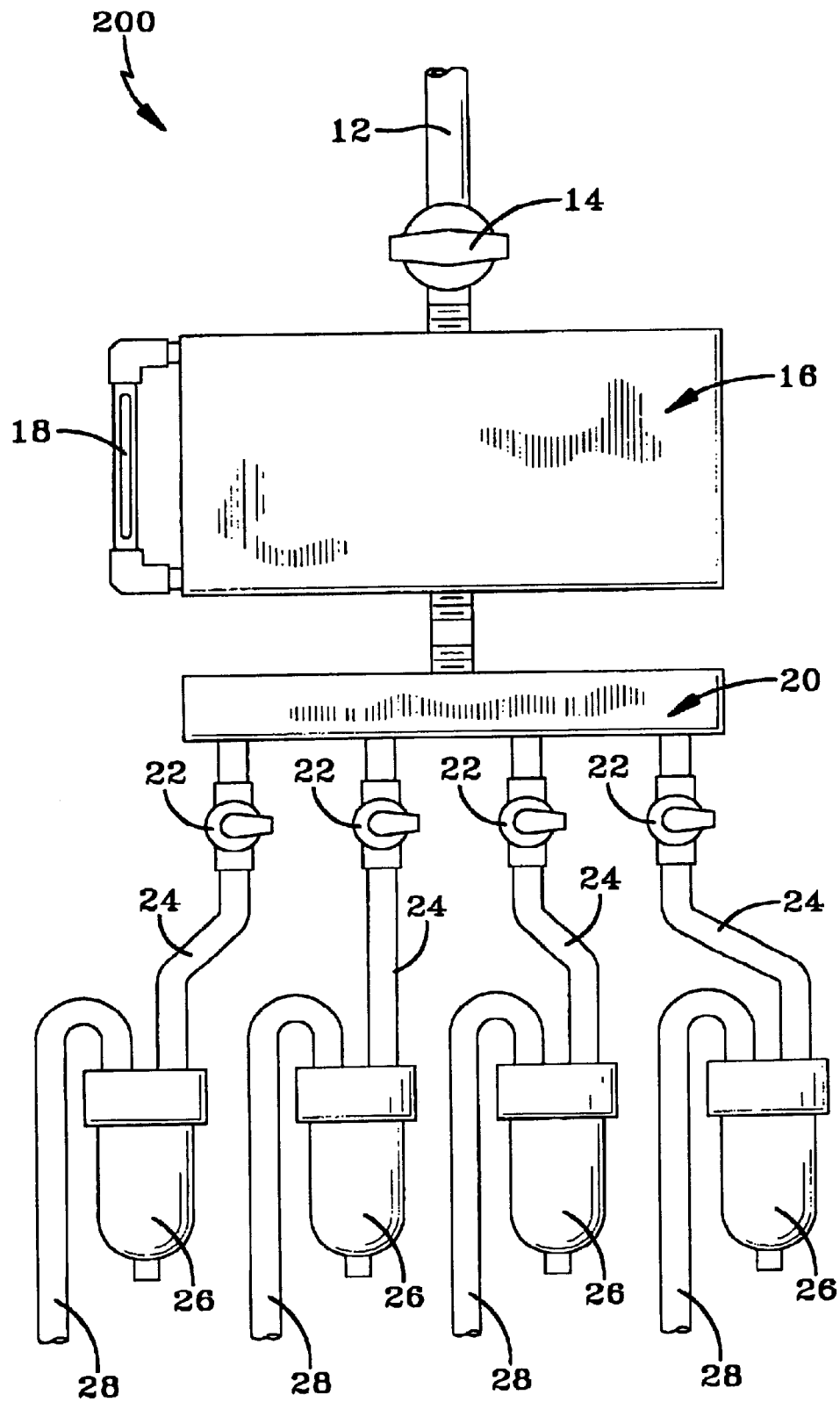
FIG. 3 is a front elevation view of an embodiment of the apparatus of the present invention.

FIG. 3 at 200 shows a front elevation view of an embodiment of the apparatus of the present invention. As can be observed, a tank 16 is provided to hold a supply of lubricant such as oil. The front view of the tank 16 shown here has a generally rectangular shape, but other shapes are possible. In addition, the tank 16 may be made from any material typically used for making storage tanks having sufficient strength to withstand an internal pressurization. Examples of suitable materials for the construction of the tank 16 include steel and fiberglass. The tank 16 shown in FIG. 3 also includes a sight glass 18 that is used to visually observe the level of lubricant held by the tank 16.

The tank 16 is connected to a source of pressurized fluid (see FIG. 4), such as air from a pressurized air source. The pressure applied to the tank 16 may also be restricted by the use of a pressure regulator (see FIG. 4) operating on the output of the source of pressurized air. For example, if a pressurized lubricant reservoir 26 operates at a pressure of 90 psig from a source of pressurized air delivered via pressure line 28, then the tank must be pressurized above 90 psig in order for the flow of a lubricant to proceed from the tank 16 to the reservoir 26. In such a scenario, it is not required for the pressure of the tank 16 to exceed the example threshold pressure of 90 psig by a large amount. Instead, a pressure regulator may be used to limit the disparity between the tank and reservoir pressures for greater control of the flow of lubricant and in consideration of the operational pressure ratings of the tank 16, the reservoirs 26, and the associated valves, pipe and fittings.

The connection of the tank to a source of pressurized fluid does not have to be permanent. As shown in FIG. 3 the tank 16 is connected to a source of pressurized air through a valve 14 and first line 12. The valve 14 may remain open during the refilling operations Lu to provide a continuous source of pressurized air for the pressurization of the tank 16 that enables the flow of lubricant to a pressurized lubricant reservoir 26. By closing the valve 14, the source of pressurized air can be disconnected from the first line 12 or the valve 14 by use of a detachable means of connection such as a quick release coupling or pipe union. In this manner, the valve 14 can be closed and the contents of the tank 16 can be isolated from a source of pressurized air and retained in the storage tank at a pressure sufficient to allow the contents of the tank to flow from the tank 16 to at least one of the pressurized lubricant reservoirs 26. It is also possible to install a check valve between the tank 16 and a source of pressurized air that will close upon a pressure in the tank 16 being greater than a pressure of the source of pressurized air. Such a check valve will prevent a backflow of lubricant from tank 16 toward the source of pressurized air.

After the tank 16 holding a lubricant is pressurized to a sufficient pressure to allow the lubricant to fill at least one of the pressurized lubricant reservoirs 26, one or more of the distribution valves 22 may be opened to allow the flow of lubricant from the tank 16. A manifold 20 is shown to demonstrate a means for connecting multiple pressurized lubricant reservoirs 26. It is also possible for the tank 16 to be connected to the reservoirs 26 without the use of a manifold 20. Although four reservoirs 26 are shown in FIG. 3, the present invention is adaptable to accommodate additional reservoirs by making additional piping connections to the tank 16 or the manifold 20. The typical flow of lubricant will be from the tank 16, through the manifold 20, through an open distribution valve 22, through a distribution line 24 and into the pressurized lubricant reservoir 26.

As shown in FIG. 4, an exemplary embodiment of the present invention may include check valves connected to the distribution lines 24 that will close upon a pressure in the pressurized lubricant reservoirs 26 being greater than a pressure in the manifold 20 or the tank 16. Check valves connected to the distribution lines 24 will prevent backflow to commonly connected lubricant reservoirs 26. Although not shown in the drawing figures, another suitable location for a check valve may be between the manifold 20 and the tank 16 that will close upon a pressure in the manifold 20 being greater that a pressure in the tank 16. Check valves at either location will prevent a backflow of lubricant from the reservoir 26 to the tank 16.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. An apparatus for transferring a liquid to a pressurized reservoir, said pressurized reservoir adapted to hold an amount of a liquid for external distribution, comprising:
    a tank to hold a supply of said liquid at a pressure greater than the pressure in said pressurized reservoir;
    a source of pressurized fluid connected to said tank for pressurizing said tank to a pressure greater than the pressure in said pressurized reservoir;
    at least one distribution valve connected to said tank; and
    a distribution line connected between said at least one distribution valve and said pressurized reservoir,
    whereby said liquid is transferred from said tank to said pressurized reservoir via the pressure difference between said tank and said pressurized reservoir, without having to first reduce or depressurize said pressurized reservoir.

2. The apparatus of claim 1 additionally comprising a supply valve connected between said source of pressurized fluid and said tank.

3. The apparatus of claim 2 additionally comprising a check valve connected between said tank and said supply valve, wherein said check valve closes upon a pressure in said tank exceeding a pressure in said source of pressurized fluid.

4. The apparatus of claim 2 further comprising a quick release coupling connected between said supply valve and said source of pressurized fluid.

5. The apparatus of claim 1 additionally comprising a check valve connected between said tank and said at least one distribution valve, wherein said check valve closes upon a pressure in said pressurized reservoir exceeding a pressure in said tank.

6. The apparatus of claim 1 additionally comprising a sight glass whereby the level of said supply of liquid is observable through said sight glass.

7. The apparatus of claim 1 wherein said source of pressurized fluid is an air compressor.

8. The apparatus of claim 1 wherein said source of pressurized fluid is a container of compressed gas.

9. The apparatus of claim 6 or 8 additionally comprising a gas pressure regulator connected between said source of pressurized fluid and said tank.

10. An apparatus for filling an already pressurized lubricant reservoir, said pressurized lubricant reservoir adapted to hold an amount of said lubricant for distribution to a connected device, comprising:
    a tank to hold a supply of a lubricant at a pressure that is greater than the pressure in said lubricant reservoir;
    a source of pressurized air capable of pressurizing said tank to a pressure greater than the pressure in said lubricant reservoir;
    a first valve connected to said tank;
    a first line connected between said first valve and said source of
    at least one distribution valve connected to said tank; and
    a distribution line connected between said at least one distribution valve and said pressurized lubricant reservoir;
    whereby said lubricant is supplied from said tank to said already pressurized reservoir as needed without depressurizing said reservoir or shutting down a device to which said reservoir provides said lubricant.

11. The apparatus of claim 10 additionally comprising a sight glass whereby the level of said supply of lubricant is observable through said sight glass.

12. The apparatus of claim 10 wherein said source of pressurized air is an air compressor.

13. The apparatus of claim 12 additionally comprising an air pressure regulator connected between said source of pressurized air and said first line.

14. A pressurized lubrication system, comprising:
    at least one lubricant reservoir containing an amount of a lubricant at a first pressure that is greater than ambient pressure, said lubricant reservoir capable of independently supplying lubrication to an apparatus for some amount of time;
    a tank for holding a supply of a said lubricant at a second pressure that is greater than said first pressure in said lubricant reservoir;
    a source of pressurized air capable of pressurizing said tank to said second pressure;
    a first valve connected to said tank for controlling the flow of pressurized air from said source of pressurized air into said tank;
    a first line connected between said first valve and said source of pressurized air;
    a manifold connected to said tank, said manifold provided to selectively dispense said lubricant to said at least one pressurized lubricant reservoir;
    at least one distribution valve connected to said manifold for controlling the flow of lubricant from said tank to said at least one pressurized lubricant reservoir; and
    at least one distribution line connected between said at least one distribution valve and said at least one pressurized lubricant reservoir,
    whereby additional lubricant is supplied to said already pressurized reservoir as needed without depressurizing said reservoir or shutting down said apparatus to which said reservoir provides lubrication.

15. The system of claim 14 additionally comprising a quick release coupling connected between said first valve and said first line.

16. The system of claim 14 additionally comprising a sight glass whereby the level of said supply of lubricant is observable through said sight glass.

17. The system of claim 14 wherein said source of pressurized air is an air compressor.

18. The system of claim 17 additionally comprising an air pressure regulator connected between said source of pressurized air and said first line.

19. The system of claim 14 wherein said supply of lubricant is oil.

20. The system of claim 14 wherein said at least one pressurized lubricant reservoir is connected to a cylinder on a robot head assembly.

21. A method for transferring a liquid to a pressurized reservoir that is adapted to hold an amount of said liquid for distribution to a connected device, comprising:

providing a storage tank containing said liquid;

providing a source of pressurized air connected by at least a first valve to said storage tank;

providing a quantity of pressurized air sufficient to pressurize said storage tank to a second pressure that is greater than the pressure in said pressurized reservoir;

opening said first valve to increase pressure inside said storage tank to a level that exceeds the pressure in said pressurized storage reservoir, opening a distribution valve on said storage tank that is connected to said pressurized reservoir, transferring an amount of said liquid from said tank to said pressurized reservoir without depressurizing said reservoir or shutting down an apparatus to which said reservoir supplies said liquid; and closing said distribution valve.

22. The method of claim 21 further comprising closing said first valve after said pressure in said tank reaches said level.

23. The method of claim 21 further comprising, depressurizing said storage tank.

24. The method of claim 21 further comprising, opening a second distribution valve connected to a second pressurized reservoir, filling said second pressurized reservoir with a quantity of said liquid, and closing said second distribution valve.

25. The method of claim 24 further comprising, opening at least one additional distribution valve connected to at least one additional pressurized reservoir, filling said at least one additional pressurized reservoir with a quantity of said liquid, and closing said at least one additional distribution valve.

26. The method of claim 21 further comprising, providing an air pressure regulator connected between said source of pressurized air and said storage tank.

27. The method of claim 26 further comprising, adjusting said air pressure regulator to provide a quantity of pressurized air sufficient to pressurize said storage tank to said second pressure.

28. The method of claim 21 wherein said liquid is oil.

29. The method of claim 21 wherein said source of pressurized air is an air compressor.

* * * * *